(12) United States Patent
Gan

(10) Patent No.: US 6,530,551 B2
(45) Date of Patent: Mar. 11, 2003

(54) DRIVE BRACKET FASTENING STRUCTURE

(75) Inventor: Li Yuan Gan, Shenzhen (CN)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/915,955

(22) Filed: Jul. 26, 2001

(65) Prior Publication Data
US 2002/0190187 A1 Dec. 19, 2002

(30) Foreign Application Priority Data
Jun. 15, 2001 (TW) ........................ 90210066U

(51) Int. Cl.[7] .................. F16M 11/00; A47G 29/00
(52) U.S. Cl. .............. 248/694; 312/223.2; 312/223.1; 312/265; 312/257.1; 312/265.5; 361/727; 361/683; 361/685; 361/725
(58) Field of Search ............... 248/27.1, 694, 248/299.1, 317; 361/727, 683, 685, 725; 312/223.2, 307, 223.1, 265.5, 257.1, 263

(56) References Cited

U.S. PATENT DOCUMENTS

| 3,586,394 A | * | 6/1971 | Hecksel | 312/246 |
| 3,822,049 A | * | 7/1974 | Saunders | 248/223.41 |
| 4,113,217 A | * | 9/1978 | O'Connell | 248/222.11 |
| 5,584,396 A | * | 12/1996 | Schmitt | 211/26 |
| 5,625,533 A | * | 4/1997 | Kim et al. | 312/319.1 |
| 5,995,364 A | * | 11/1999 | McAnally et al. | 361/685 |
| 6,098,944 A | * | 8/2000 | Pangborn et al. | 248/316.1 |
| 6,134,103 A | * | 10/2000 | Ghanma | 248/917 |
| 6,246,580 B1 | * | 6/2001 | Weng | 174/16.1 |
| 6,272,009 B1 | * | 8/2001 | Buican et al. | 312/223.5 |
| 6,386,656 B1 | * | 5/2002 | Chen | 312/223.2 |
| 2002/0043908 A1 | * | 4/2002 | Gan | 312/223.2 |

* cited by examiner

Primary Examiner—Kimberly Wood
(74) Attorney, Agent, or Firm—Wei Te Chung

(57) ABSTRACT

A drive bracket fastening structure includes first and second drive brackets (30, 70) and a connect panel (60). The first drive bracket includes a bottom plate (32). A pair of arcuate first slide rails (40) depends from the bottom plate. A first flange (42) depends from the bottom plate near a side thereof. A pair of through holes (44) is defined in the first flange. The connect panel is secured to the second drive bracket. The connect panel upwardly forms a pair of arcuate second slide rails (62). A second flange (64) extends upwardly from a side edge of the connect panel. A pair of screw holes is defined in the second flange. The second slide rails are slidably engaged with the first slide rails. The screw holes are aligned with the through holes for insertion of fasteners therein. The second drive bracket is thereby fastened to the first drive bracket.

10 Claims, 3 Drawing Sheets

DRIVE BRACKET FASTENING STRUCTURE

BACKGROUND OF THE INVENTION

1. Field of the Invention

The present invention relates to fastening of drive brackets, and more particularly to fastening structures for conveniently fastening drive brackets to computer enclosures.

2. Description of Related Art

A personal computer enclosure usually comprises first and second drive brackets for accommodating data storage devices therein. Typically, the first drive bracket is firstly secured to the computer enclosure, and the second drive bracket is subsequently fastened to a bottom surface of the first drive bracket. The second drive bracket is usually secured directly to the first drive bracket with screws.

Taiwan Patent No. 83202773 discloses a fastening means by which the second drive bracket is directly fastened to the pre-installed first drive bracket using screws. Screw holes are defined in the first drive bracket. Flanges are formed at upper portions of the second drive bracket. At least two through holes are defined in each flange. Screws fasten the second drive bracket to the first drive bracket. As a result, installation and removal of the second drive bracket is unduly complicated and laborious. Furthermore, when the screws are secured in the through holes and the screw holes with a tool during assembly, components of the computer are prone to be accidentally damaged.

Taiwan Patent No. 81205427 discloses a fastening means by which the second drive bracket is slidably fastened to the first drive bracket. The first drive bracket forms flanges at opposite sides thereof The second drive bracket forms tabs corresponding to the flanges of the first drive bracket. In assembly, the second drive bracket is engaged with the pre-installed first drive bracket from a rear of the first drive bracket. The tabs of the second drive bracket are linearly slid along the corresponding flanges of the first drive bracket until the second drive bracket is fully engaged under the first drive bracket.

To perform such installation, significant space within the enclosure rearward of the first drive bracket is required. Such space is equal to at least double a volume of the second drive bracket itself. Such space effectively adds to the size of the enclosure, making the enclosure less compact and less convenient.

An improved fastening structure which overcomes the above-mentioned problems is strongly desired.

SUMMARY OF THE INVENTION

Accordingly, an object of the present invention is to provide a drive bracket fastening structure which conveniently fastens a drive bracket of a computer enclosure without risk of damage to components accommodated in the enclosure.

Another object of the present invention is to provide a drive bracket fastening structure which saves valuable space within a computer enclosure.

In order to achieve the objects set out above, a drive bracket fastening structure of the present invention comprises first and second drive brackets and a connect panel. The first drive bracket comprises a bottom plate. A pair of arcuate first slide rails depends from the bottom plate. A first flange depends from the bottom plate near a side thereof. A pair of through holes is defined in the first flange. The connect panel is secured to the second drive bracket. The connect panel upwardly forms a pair of arcuate second slide rails. A second flange extends upwardly from a side edge of the connect panel. A pair of screw holes is defined in the second flange. The second slide rails are slidably engaged with the first slide rails. The screw holes are aligned with the through holes for insertion of fasteners therein. The second drive bracket is thereby fastened to the first drive bracket.

Other objects, advantages and novel features of the present invention will become more apparent from the following detailed description when taken in conjunction with the accompanying drawings.

DETAILED DESCRIPTION OF THE INVENTION

Figure 1:
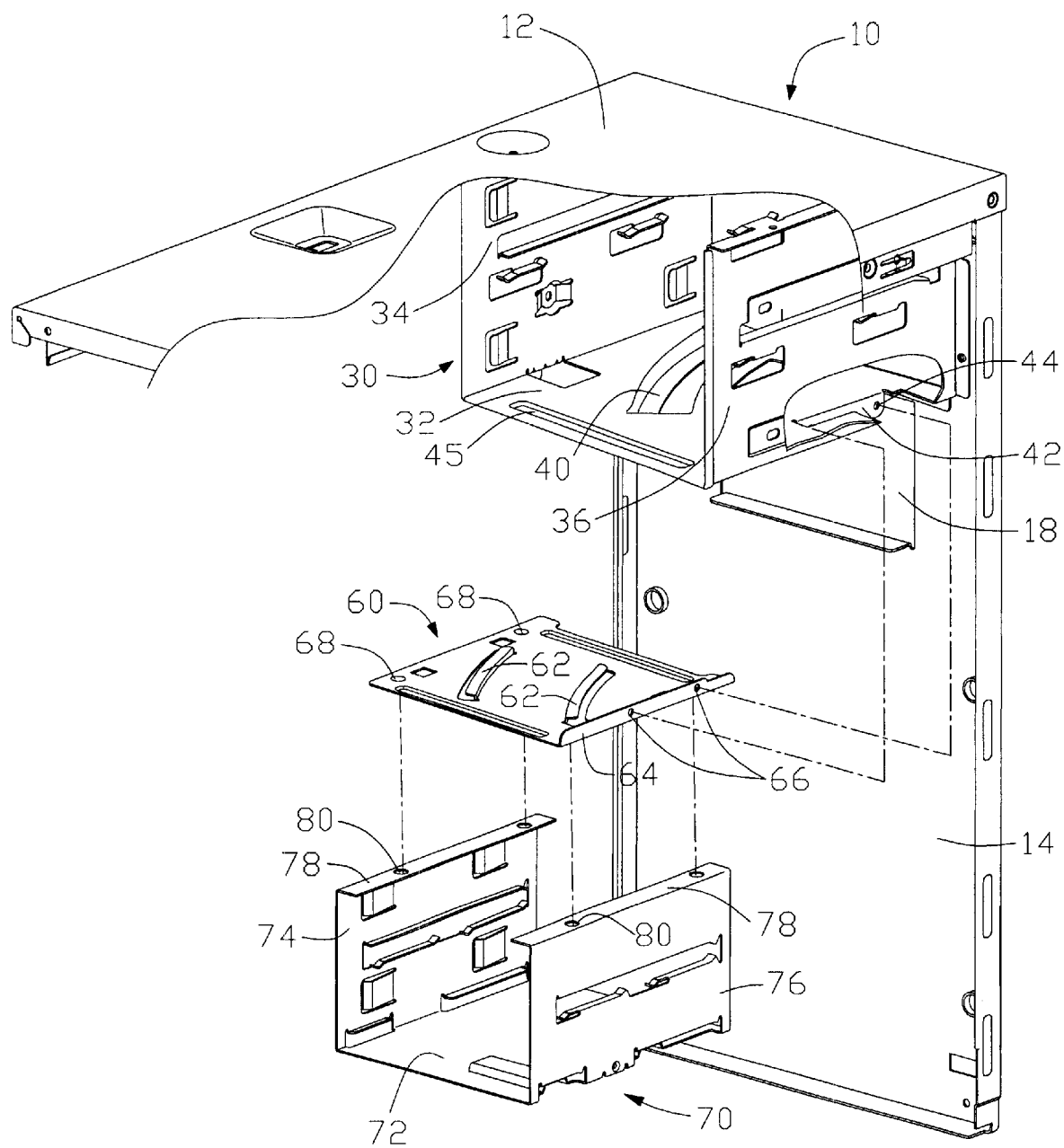
FIG. 1 is an exploded view of a fastening structure of the present invention together with part of a computer enclosure, with part of a first drive bracket of the fastening structure cut away for clarity.

Reference will now be made to the drawing figures to describe the present invention in detail.

Referring to FIG. 1, a preferred embodiment of a fastening structure comprises first and second drive brackets 30, 70 and a connect panel 60. A computer enclosure 10 accommodates the first and second brackets 30, 70 therein. The enclosure 10 comprises a top wall 12, and a front wall 14 depending from a side of the top wall 12. The front wall 14 defines a first opening (obscured by the first drive bracket 30 in FIG. 1) and a second opening 18. The second opening 18 is disposed below the first opening. The first drive bracket 30 is secured to the enclosure 10 at the first opening. The second drive bracket 70 is fastened to the first drive bracket 30 by the connect panel 60, and is aligned with the second opening 18.

The first drive bracket 30 comprises a bottom plate 32, and a pair of side plates 34, 36 extending upwardly from opposite sides of the bottom plate 32 respectively. A pair of arcuate and parallel first slide rails 40 (only one visible in FIG. 1) is stamped downwardly from the bottom plate 32. Each first rail 40 has an L-shaped profile, with respective free edges of the first rails 40 facing toward each other. In the preferred embodiment, the first rails 40 extend generally from one side of the bottom plate 32 near the front wall 14 to an opposite side of the bottom plate 32 farther from the front wall 14. Further, concave sides of the first rails 40 generally face toward the front wall 14, whereas convex sides of the first rails 40 generally face away from the front wall 14. A first flange 42 depends from the bottom plate 32 parallel and proximate to the said opposite side of the bottom plate 32. A pair of through holes 44 (only one visible in FIG. 1) is defined in the first flange 42. A reinforcing rib 45 is formed in the bottom plate 32 proximate and parallel to an edge of the bottom plate 32 farthest from the front wall 14.

The connect panel 60 is generally rectangular. A pair of arcuate and parallel second slide rails 62 is stamped upwardly from the connect panel 60. Each second rail 62 has an L-shaped profile, with respective free edges of the second rails 62 facing away from each other. The second rails 62 are oriented in the connect panel 60 such that they are generally parallel to and correspond to the first rails 40 of the first drive bracket 30. Four locating holes 68 are respectively defined in four corners of the connect panel 60. A second flange 64 is bent upwardly from one side edge of the connect panel 60, corresponding to the first flange 42 of the first drive bracket 30. A pair of screw holes 66 is defined in the second flange 64, corresponding to the through holes 44 of the first flange 42.

The second drive bracket 70 comprises a bottom panel 72, and a pair of side panels 74, 76 extending upwardly from opposite sides of the bottom panel 72. A third flange 78 extends horizontally inwardly from an upper edge of each side panel 74, 76. A pair of bores 80 is defined in each third flange 78, corresponding to the locating holes 68 of the connect panel 60.

Figure 2:
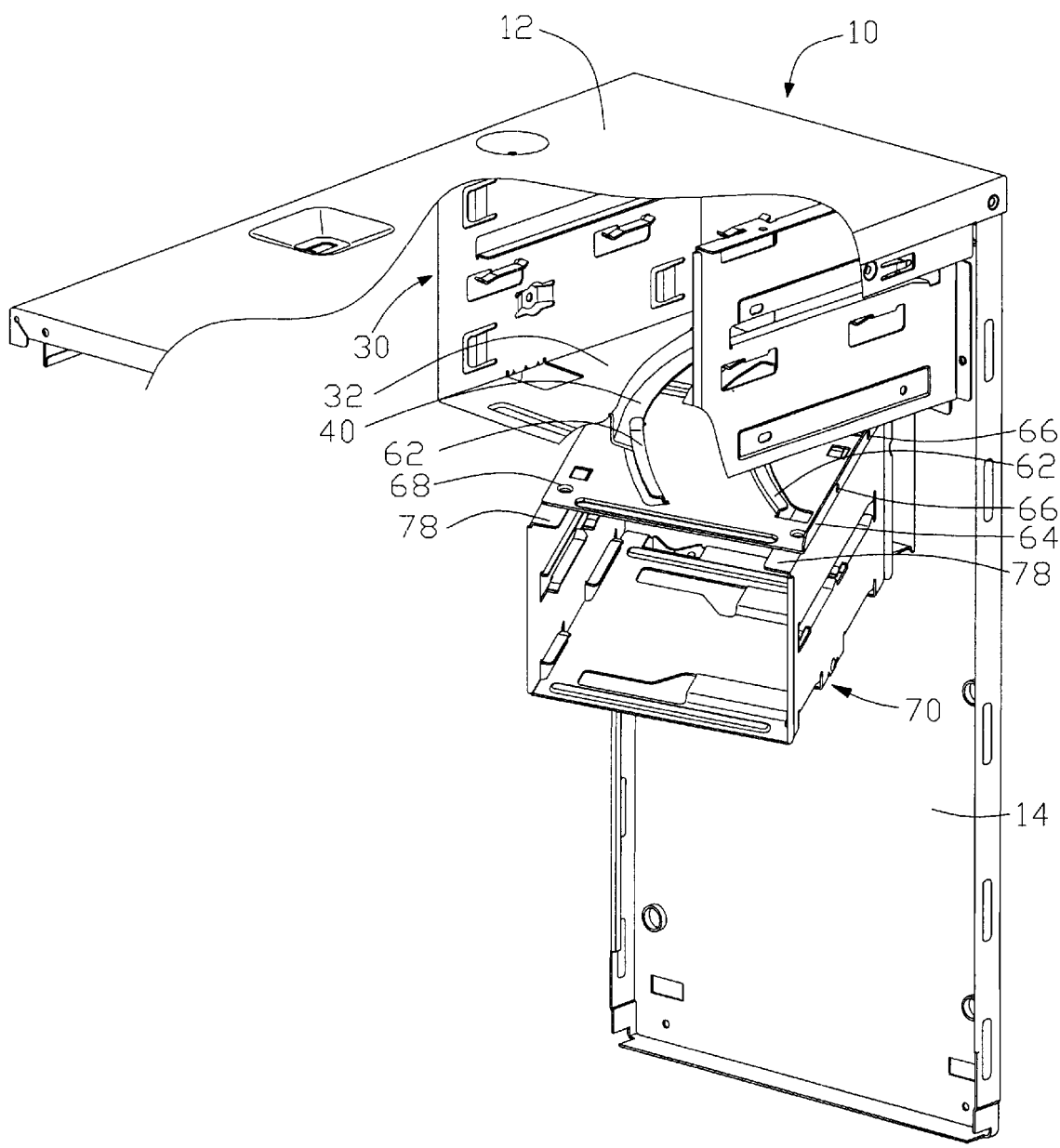
FIG. 2 is a partly assembled view of FIG. 1, with another part of the first drive bracket cut away for clarity.
Figure 3:
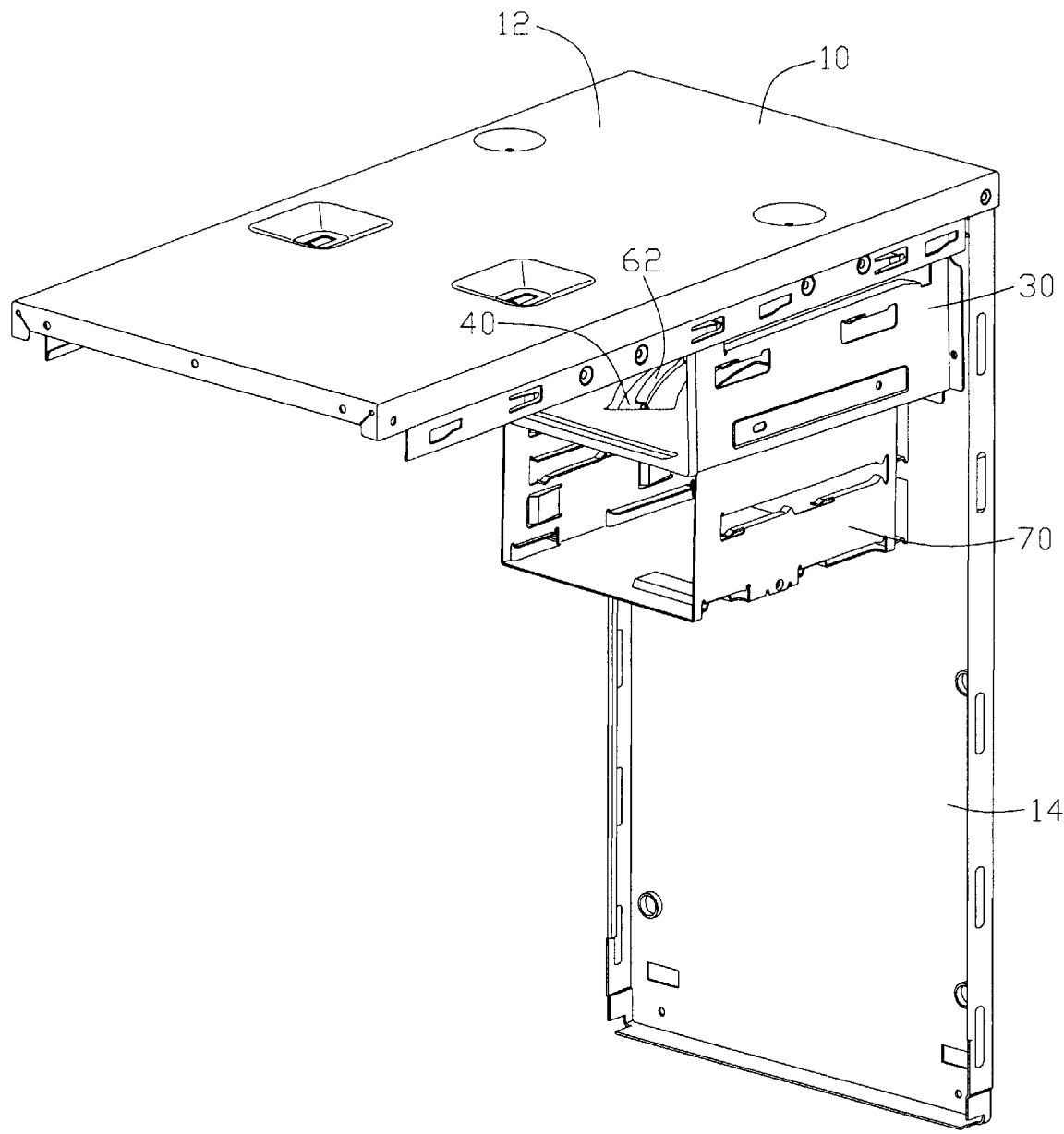
FIG. 3 is a fully assembled view of FIG. 1.

Referring to FIGS. 1–3, in pre-assembly, the connect panel 60 is placed on the second drive bracket 70. The locating holes 68 of the connect panel 60 are aligned with the corresponding bores 80 of the second drive bracket 70. Fasteners such as screws (not shown) are inserted into the locating holes 68 and the bores 80, to thereby secure the connect panel 60 to the second drive bracket 70.

In assembly, the first drive bracket 30 is secured in the enclosure 10 by conventional means. The combined connect panel 60 and second drive bracket 70 is inserted into the enclosure 10 from a side thereof. Ends of the second rails 62 of the connect panel 60 are slidingly engaged with ends of the corresponding first slide rails 40 of the first drive bracket 30 (see FIG. 2). The second drive bracket 70 is pushed so that the second slide rails 62 slide along the first slide rails 40 until the second slide rails 62 are fully engaged with the first slide rails 40. At this stage, the second flange 66 of the connect panel 60 abuts against the first flange 42 of the first drive bracket 30. The screw holes 66 of the connect panel 60 are aligned with the corresponding through holes 44 of the first drive bracket 30. Fasteners such as screws (not shown) are inserted into the screw holes 66 and the through holes 44, to thereby fasten the second drive bracket 70 to the first drive bracket 30.

The fastening structure of the present invention has at least the following advantages. Firstly, it has only one first flange 42 and one second flange 64, unlike prior art which requires two of each such flanges. Accordingly, the number of through holes 44 defined in the first drive bracket 30 is reduced. As a result, the number of fasteners required is also reduced. This also reduces the risk of accidental damage to components within the enclosure when fasteners are secured in the through holes 44 with a tool during assembly. Secondly, due to the arcuate shape of the first and second slide rails 40, 62, the second drive bracket 70 is effectively installed by rotating it into an interior of the enclosure 10 from a side of the enclosure 10. This saves valuable space within the enclosure 10 which would otherwise be required inwardly from the installed second drive bracket 70.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A drive bracket fastening structure comprising:

a first drive bracket comprising a bottom plate, a pair of arcuate first slide rails depending from the bottom plate, a first flange depending from the bottom plate near a side thereof;

a second drive bracket; and a connect panel secured onto the second drive bracket, the connect panel upwardly forming a pair of arcuate second slide rails corresponding to and slidably engaged with the first slide rails, a second flange extending upwardly from one side edge of the connect panel, the second flange abutting against the first flange and fixedly connecting therewith.

2. The drive bracket fastening structure in accordance with claim 1, wherein each first slide rail of the first drive bracket has an L-shaped profile, and wherein each second slide rail of the second drive bracket has an L-shaped profile.

3. The drive bracket fastening structure in accordance with claim 1, wherein the second drive bracket comprises a bottom panel and a pair of side panels extending upwardly from opposite edges of the bottom panel, and wherein a pair of third flanges extends inwardly from respective upper portions of the side panels, the connect panel being secured onto the third flanges of the second drive bracket.

4. The drive bracket fastening structure in accordance with claim 1, wherein each first slide rail has a free edge, and the free edges face toward each other.

5. The drive bracket fastening structure in accordance with claim 1, wherein each second slide rail has a free edge, and the free edges face away from each other.

6. The drive bracket fastening structure in accordance with claim 1, wherein a reinforcing rib is formed on the bottom plate of the first drive bracket.

7. A drive bracket fastening structure comprising:

a first bracket adapted to be secured to a computer enclosure, the first bracket comprising a bottom plate, a pair of spaced first slide rails depending from the bottom plate, each rail being arcuate; and a second bracket rotatably engaging with the first bracket from an exterior to an interior of the computer enclosure, the second bracket comprising a bottom panel, a pair of side panels extending upwardly from opposite sides of the bottom panel, and a connect panel placed on the side panels, the connect panel forming a pair of arcuate second slide rails thereon, the second slide rails being slidably engaged with the first slide rails.

8. The drive bracket fastening structure in accordance with claim 7, wherein a first flange depends from the bottom plate of the first bracket near a side thereof.

9. The drive bracket fastening structure in accordance with claim 8, wherein a second flange extends upwardly from a side edge of the connect panel of the second bracket, and is fixedly connected to the first flange of the first bracket.

10. The drive bracket fastening structure in accordance with claim 7, wherein the first slide rails are generally parallel to each other, and wherein the second slide rails are generally parallel to each other.

* * * * *